(12) United States Patent
Medwed et al.

(10) Patent No.: US 11,295,025 B2
(45) Date of Patent: Apr. 5, 2022

(54) PROBABILISTIC MEMORY SAFETY USING CRYPTOGRAPHY

(71) Applicant: NXP B.V., Eindhoven (NL)

(72) Inventors: Marcel Medwed, Graz (AT); Jan Hoogerbrugge, Helmond (NL); Ventzislav Nikov, Haasrode (BE); Asier Goikoetxea Yanci, Glasgow (GB)

(73) Assignee: NXP B.V, Eindhoven (NL)

(*) Notice: Subject to any disclaimer, the term of this patent is extended or adjusted under 35 U.S.C. 154(b) by 469 days.

(21) Appl. No.: 16/427,977

(22) Filed: May 31, 2019

(65) Prior Publication Data
US 2020/0380140 A1 Dec. 3, 2020

(51) Int. Cl.
| | | |
|---|---|---|
| *G06F 21/60* | (2013.01) | |
| *G06F 17/18* | (2006.01) | |
| *G06F 21/62* | (2013.01) | |

(52) U.S. Cl.
CPC ............ *G06F 21/602* (2013.01); *G06F 17/18* (2013.01); *G06F 21/6218* (2013.01)

(58) Field of Classification Search
CPC .... G06F 21/602; G06F 17/18; G06F 21/6218; G06F 12/1027; G06F 12/0897; G06F 2212/466; G06F 21/64; G06F 12/1408; Y02D 10/00; H04L 9/0618; H04L 9/0894; H04L 63/0428
See application file for complete search history.

(56) References Cited

U.S. PATENT DOCUMENTS

| | | | |
|---|---|---|---|
| 2003/0065929 A1 | 4/2003 | Milliken | |
| 2003/0217277 A1 | 11/2003 | Narayanan | |
| 2013/0290607 A1* | 10/2013 | Chang | G06F 9/3842 |
| | | | 711/103 |
| 2015/0067355 A1 | 3/2015 | Hall | |
| 2016/0154746 A1* | 6/2016 | Cooke | G06F 21/85 |
| | | | 713/193 |
| 2017/0017791 A1 | 1/2017 | Brandt | |

(Continued)

FOREIGN PATENT DOCUMENTS

| | | |
|---|---|---|
| DE | 10 2015 113 468 A1 | 2/2017 |
| WO | WO-2016/048457 | 3/2016 |

OTHER PUBLICATIONS

ARM® Architecture Reference Manual ARMv8, for ARMv8-A architecture profile, 2013 ARM Limited. All rights reserved. ARM DDI 0487A.a (ID090413). (https://yurichev.com/mirrors/ARMv8-A_Architecture_Reference_Manual_(Issue_A.a).pdf).

(Continued)

*Primary Examiner* — Meng Li (57) ABSTRACT

A chip for securing storage of information includes a manager to access a pointer and a cipher engine to decrypt stored data. The pointer includes a first area and a second area. The first area includes an address indicating a storage location of the data and the second area includes a safety tag. The cipher engine decrypts the data output from the storage location based on a key and the safety tag in the second area of the pointer. These and other operations may be performed based on metadata that indicate probabilities that a correct safety tag was used to decrypt the data. In another embodiment, the manager may be replaced with an L1 cache.

18 Claims, 10 Drawing Sheets

(56) References Cited

U.S. PATENT DOCUMENTS

2017/0046280 A1\* 2/2017 Driessen ............ G06F 12/1408
2017/0285976 A1\* 10/2017 Durham ............ G06F 12/1408

OTHER PUBLICATIONS

Austin, Todd M., et al. "Efficient Detection of All Pointer and Array Access Errors", Proceedings of the SIGPLAN '94 Conference on Programming Language Design and Implementation, 12 pages.
Duck, G. J., et al. "Heap Bounds Protection with Low Fat Pointers", CC'16, Mar. 17-18, 2016, Barcelona, Spain ACM. 978-1-4503-4241—Apr. 16, 2003. 11 pages (http://dx.doi.org/10.1145/2892208.2892212).
Necula George C, et al., "CCured: Type-Safe Retrofitting of Legacy Code", Principles of Programming Languages, 2002, pp. 128-139.
Jim, Trevor, et al., "Cyclone: A safe dialect of C", 14 pages, Cornell University, (http://www.cs.cornell.edu/projects/cyclone).
Kwon, Albert, et al. "Low-Fat Pointers: Compact Encoding and Efficient Gate-Level Implementation of Fat Pointers for Spatial Safety and Capability-based Security", CCS'13, Nov. 4-8, 2013, Berlin, Germany, 12 pages. (http://dx.doi.org/10.1145/2508859.2516713).
Nagarakatte, Santosh, et al., "CETS: Compiler-Enforced Temporal Safety for C", ISMM'10, Jun. 5-6, 2010, Toronto, Ontario, Canada, pp. 1-10.
Liskov, Moses et al.; "Tweakable Block Ciphers;" Journal of Cryptology vol. 24, pp. 588-613; Online Publication Sep. 2, 2010; DOI: 10.1007/s00145-010-9073-y.

\* cited by examiner

PROBABILISTIC MEMORY SAFETY USING CRYPTOGRAPHY

TECHNICAL FIELD

Example embodiments disclosed herein relate to protecting data stored in a memory.

BACKGROUND

Data security is essential in order to maintain a viable business and protect the financial and privacy interests of individuals. When data is stored in a memory, certain aspects of the memory make it vulnerable to attack. These aspects include buffer overflows, use-after-free, and return-oriented programming (ROP) attacks, as well as others.

Attempts have been made to secure the data stored in a memory. Some attempts are performed at the programming level, e.g., most modern languages (e.g., Java) are memory safe. For spatial memory safety (e.g., counteracting buffer overflows), fat pointers and optimized variants have been developed. For temporal memory safety (e.g., counteracting use-after-free attacks), lock-and-key based approaches have been proposed. However, the overhead associated with these and other techniques have prevented them from being widely adopted. Moreover, some of these approaches must be retrofitted onto existing systems, which increases costs and complexity.

Another attempt to secure data involves storing tags with data in a memory. This approach has a number of drawbacks. For example, because unmodified memories do not have sufficient space to store tags with data, the memories must be modified to include extra space to accommodate the tags. Modifying a memory to include extra space increases size and costs and also the power that is consumed. Also, considerable processing overhead must be expended in order to manage the tags.

Another attempt to secure data involves using error correction codes (ECC). Such an approach has been used for data stored in random access memory (RAM) modules. However, ECC bits are subject to abuse. Also, the granularity of these bits is coarse, and the number of bits used may be insufficient for many applications.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one or more embodiments, a chip for securing storage of information includes a manager configured to access a first pointer and a first cipher engine configured to decrypt stored data, wherein the first pointer includes a first area and a second area, wherein the first area includes an address indicating a storage location of the data and the second area includes a safety tag, and wherein the first cipher engine is configured to decrypt the data output from the storage location based on a key and the safety tag in the second area of the first pointer. The first pointer may have a size corresponding to an N-bit architecture, a size of the first area may be M bits and a size of the second area may be X bits, where X+M≤N.

The first cipher engine may encrypt the data for storage at the storage location in response to a write request, the data encrypted based on the key and the safety tag. The chip may include a cache including a storage area and a first slot, wherein the storage area may store metadata and the first slot may store the decrypted data. The cache may output the decrypted data from a first slot based on a first set of values of the metadata, the decrypted data may be output from the first slot based a read request, and at least one value of the first set of values may indicate a probability that the first cipher engine used a correct safety tag to decrypt the data. The cache may change the metadata stored in the storage area when the decrypted data is output from the first slot based on the read request.

The chip may include a second cipher engine, wherein the cache may include a second slot to store the data in encrypted form, the cache may output the data in encrypted form from the second slot to the second cipher engine based on a second set of values of the metadata, and the second cipher engine may decrypt the data from the second slot based on the key and the safety tag and output the decrypted data in response to a read request. The cache may change the metadata stored in the storage area when the second cipher engine decrypts the data. At least one value of the second set of values of the metadata may indicate a probability that the first cipher engine used a wrong or corrupted safety tag to decrypt the data.

The chip may include a second cipher engine, wherein the cache may output the decrypted data from the first slot to the first cipher engine based on the metadata, the first cipher engine may encrypt the data a second time based on the key and the safety tag, and the second cipher engine may decrypt the data encrypted for the second time and output the data in response to a read request. The chip may include a cache to store a plurality of pointers including the first pointer, the cache may be coupled to or included within the manager and the pointers indicate storage locations for a respectively plurality of data, and the pointers may include different safety tags used to encrypt respective ones of the plurality of data. The first cipher engine may encrypt the data stored in the storage location.

In accordance with one or more embodiments, a method for securing storage of information includes accessing a pointer, decrypting stored data based on the pointer, and outputting the decrypted data in response to a read request, wherein the first pointer includes a first area and a second area, wherein the first area includes an address indicating a storage location of the data and the second area includes a safety tag, and wherein decrypting the stored data includes decrypting the data based on a key and the safety tag included in the second area of the first pointer. The first pointer may have a size corresponding to an N-bit architecture, a size of the first area may be M bits, and a size of the second area may be X bits, where X+M≤N.

The method may include encrypting the data for storage at the storage location based on a write request, the data encrypted based on the key and the safety tag. The method may include storing the decrypted data in a first slot of a cache and storing metadata in a storage area corresponding to the first slot. The method may include outputting the decrypted data from the first slot based on a first set of values of the metadata. The method may include storing the data corresponding to the first pointer in a second slot of the cache, the data stored in the second slot stored in encrypted form, and decrypting the data stored in the second slot in encrypted form based on a second set of values of the metadata, the data stored in the second slot decrypted based on the key and the safety tag corresponding to the first pointer.

The method may include changing the metadata stored in the storage area when encrypted data stored in the second slot is decrypted. Each of the first set of values of the metadata and the second set of values of the metadata may include at least one value. The method may include encrypting the decrypted data stored in the first slot based on the metadata, the decrypted data encrypted a second time based on the key and the safety tag. The method may include encrypting the data stored in the storage location.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of element's discussed, are used to distinguish one element from the next, and are generally interchangeable. Values such as maximum or minimum may be predetermined and set to different values based on the application.

Example embodiments describe systems and methods for securing data in a storage device. In one embodiment, a pointer includes an address indicating the location where data is to be read/written and a memory security tag for protecting unauthorized access to the data. The data may be encrypted/decrypted based on at least one key and the memory security tag stored in the pointer. The memory safety tag thus serves as a tweak for the encrypted data. By including the tweak in a field or predetermined number of bits in the pointer, the storage space (e.g., memory or cache) does not have to be modified to accommodate the encrypted data with tags. Also, costs and power consumption for the storage device are significantly reduced, along with processing overhead and latency issues.

Figure 1A:
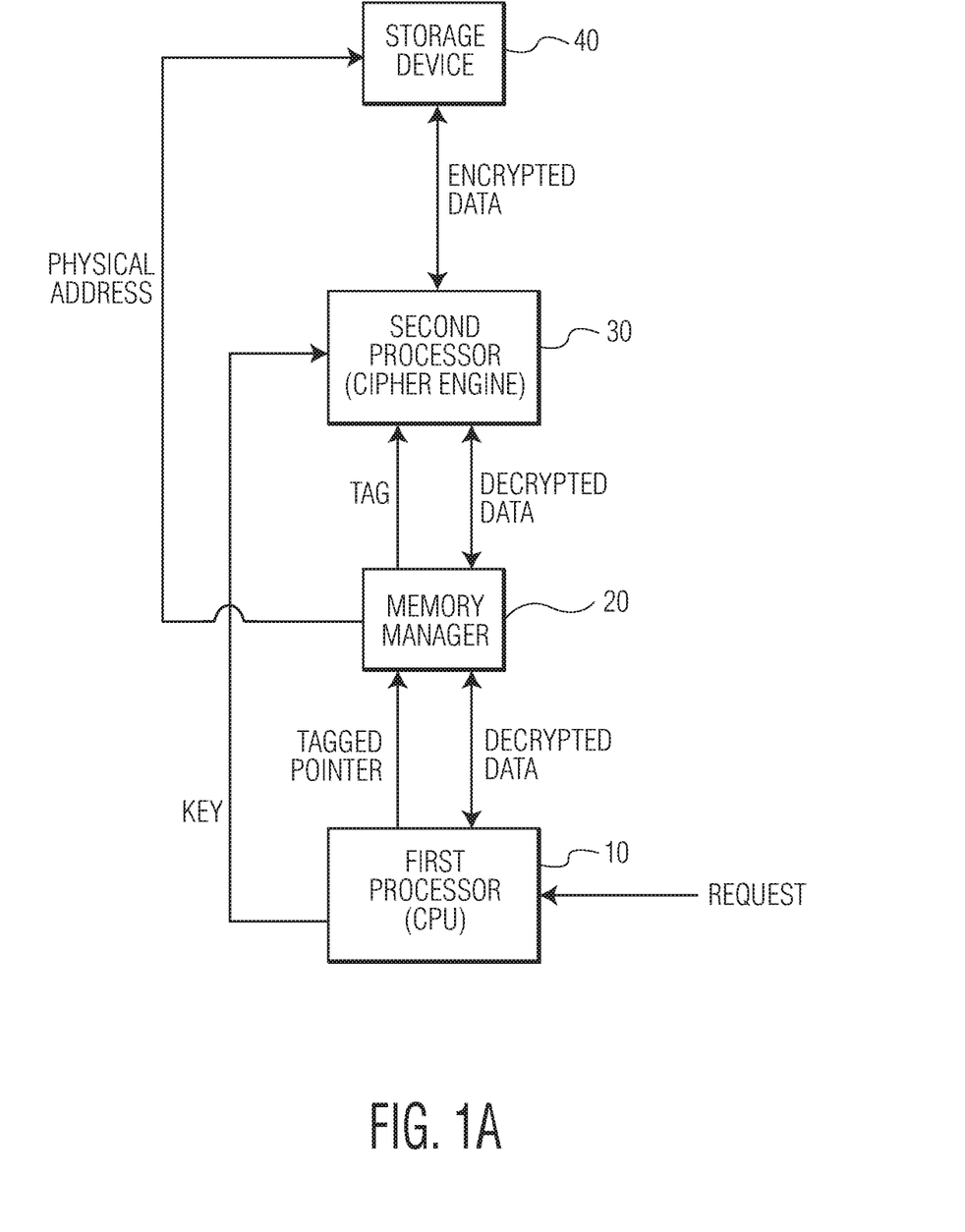
FIG. 1A illustrates an embodiment of a system for securing data in a memory.

FIG. 1A illustrates an embodiment of a system for securing data stored in a memory. As illustrated in FIG. 1A, the microcontroller system includes a first processor 10, a memory manager 20, and a second processor 30. The first processor 10 may be a central processing unit (CPU), a microcontroller, or another type of processing system for performing various operations, including but not limited to, performing memory read and write operations based on one or more memory security tags. In one embodiment, the processor 10 may provide data and tagged pointers to the memory manager 20 and may receive decrypted data in response to data requests. The first processor 10 may also provide a key to the second processor 30 for use in encrypting/decrypting data stored in a storage device 40.

The memory manager 20 may control operations of the storage device 40 and may be coupled between the processor 10 and the second processor 30. In one embodiment, the memory manager 20 may translate virtual memory addresses to physical addresses for purposes of accessing or retrieving stored data. In one embodiment, the memory manager may divide the virtual address space for the memory into pages using a page table. The page table may, for example, map virtual page numbers to physical page numbers for an associative cache (e.g., translation lookaside buffet (TLB)). In addition, the memory manager 20 may perform memory protection operations in association with the second processor 30. As illustrated in FIG. 1A, the memory manager 20 may include a memory management unit (MMU) and cache subsystem but may have a different configuration in another embodiment.

The second processor 30 may include a cipher engine to perform a low latency cipher operation relative to data to be stored in the storage device 40. This cipher operation may be performed based on a key and a tweak from the first processor 10. The tweak may include a memory safety tag to be used in encrypting/decrypting data to be stored in or read from the storage device 40. The second processor 30 may encrypt/decrypt the data using various algorithms, including but not limited to, a tweakable block cipher algorithm or a standard block cipher in a tweaked mode.

A block cipher may include a family of permutations where the key selects a particular permutation from that family. In tweakable block cipher, both the key and the tweak (e.g., memory safety tag) may select a permutation for use by the second processor 30 for encrypting/decrypting data. For example, a tweak function may use a physical memory address as a tweak to a block cipher to bind unencrypted data with the physical memory address. The tweak function may include, for example, XTS (XOR-encrypt-XOR)/XEX-based tweaked codebook mode with ciphertext stealing) algorithm, Liskov, Rivest, and Wagner (LRW) algorithm, and so on, combinations thereof.

In operation, the second processor 30 receives a memory safety tag from the memory manager 20 (which serves as a tweak) and encrypts data received from the first processor 10 through the memory manager 20. The second processor 30 may encrypt this data using the key front the first processor 10 and the tweak (memory safety tag). The encrypted data may then be stored at a location in storage device 40 which corresponds to a physical address indicated by the memory manager 20. The second processor decrypts data read from the storage device 40 using the key from the first processor 10, in association with its corresponding memory safety tag. The decrypted data may then be output to the first processor 10 through memory manager 20.

The storage device 40 may be a memory, a cache, or another type of storage device. In one example, the storage device 40 may be a dynamic random access memory (DRAM) for storing data which has been encrypted by the second (cipher) processor 30. In another example, the storage device may be an L2 cache including cache lines for storing data which has been partitioned into one or more data words.

Figure 1B:
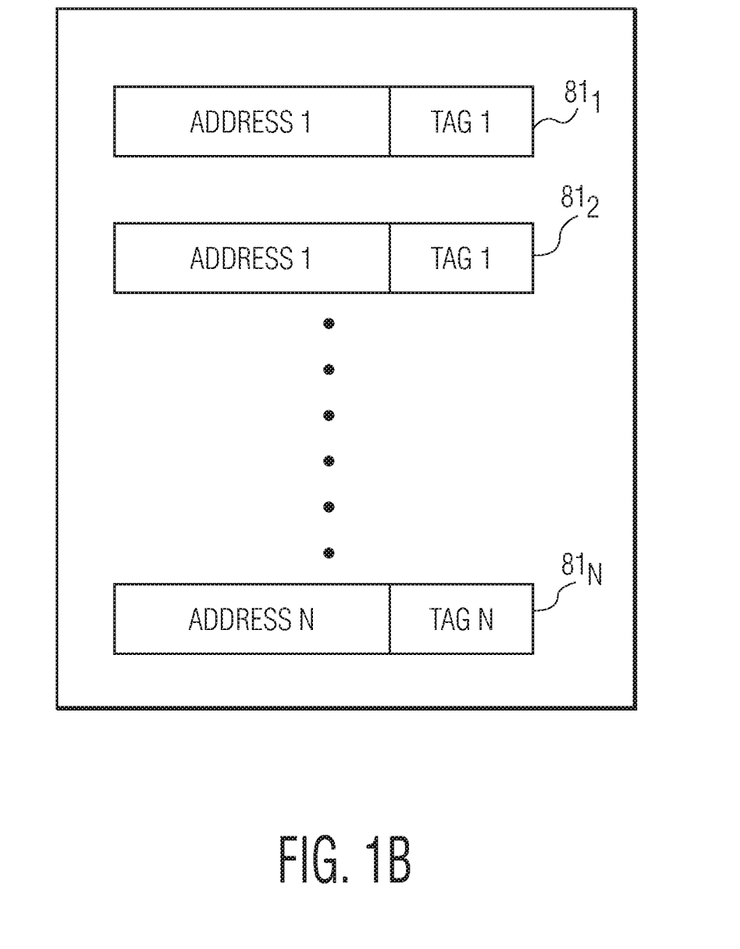
FIG. 1B illustrates an example of stored pointers including memory safety tags.

FIG. 1B illustrates an example of a plurality of pointers $81_1, 81_2, \ldots, 81_N$ used to store the data in the storage device 40. In this embodiment, the pointers are stored in an internal cache of memory manager 20, but may be stored in a cache or storage area coupled to the memory manager 20 in another embodiment. Each of the pointers $81_1, 81_2, \ldots, 81_N$ stores an address and a memory safety tag used to encrypt (and that will also be used to decrypt) the data stored in the storage device 40.

In one embodiment, the data may be encrypted by the second processor 30 using a, N-bit (e.g., 64-bit) block cipher. In this case, the second processor (e.g., crypto engine) 30 may be situated between a last level cache (LLC) and the memory 40. The data stored in the memory 40 (e.g., DRAM) is encrypted and all cache content is decrypted. In addition, the LLC cache may store one or more memory security tags (or tweaks) used for decryption together with the data. Here, a trade-off is possible to shift the crypto engine 30 closer to the first processor (e.g., CPU), which would generate a latency in the decryption having a greater impact on the overall performance but would reduce costs for the LLC because the memory safety tag storage would not be needed there. Also, in one embodiment, memory manager 20 may ignore memory safety tag bits, for example, in the most significant bits of a pointer, like Arm's ignore top byte feature. When a block cipher is used, the block cipher size may be different from 64 bits in another embodiment.

Figure 2:
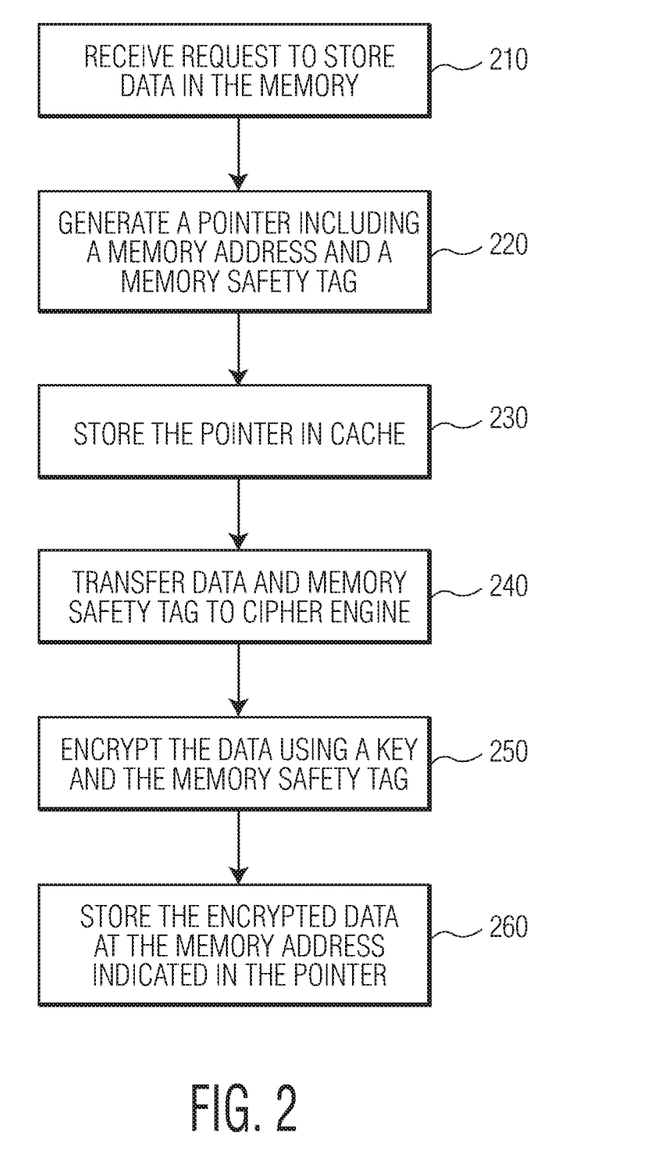
FIG. 2 illustrates an embodiment of a method for securing data in a memory.

FIG. 2 illustrates an embodiment of a method for securing data stored in storage device 40. In this embodiment, the storage device 40 may include a memory that stores data for a host system, which, for example, may be a computer, a mobile device, or another type of system or device that stores and/or accesses data. In one embodiment, the memory may be a portable storage device (e.g., portable hard drive), a server, a workstation, or a storage device used, for example, in connection with or attached to a network. Examples of such a network include a cloud network, a mobile communications network, a virtual private network, or another type of network that stores data. The method may be performed by the systems of FIG. 1 or may be performed by a different system. For illustrative purposes, the method will be described with reference to the system of FIG. 1.

At 210, the method includes receiving a request to store data to the memory 40. The request may be received by the first processor 10 from a host system (or other device in communication with the first processor) for storing data in memory 40. The request may include the data to be stored or may include an instruction to retrieve and store data located at a particular location.

The data may first be stored in a cache (e.g., a write-back cache in or coupled to memory manager 20) before it is stored in the memory 40. For example, when the processor 10 performs a store and the data block to which the data is stored is already in the cache, then the data to be stored may be inserted into the block of data that is cached. However, nothing may be written to the memory 40 at this time. Instead, in accordance with one embodiment, the memory block in the cache may be marked as 'dirty'. Subsequently, when there is a cache miss and it is decided that a block should be replaced in the cache, then that block is checked for being dirty. If it is dirty, then the data in it may be sent to in the memory 40. At this time, the data is written to the memory (or a lower level cache, as will be explained in accordance with another embodiment).

In accordance with one or more embodiments, a memory safety tag that was in the pointer used to load the block in the data cache is stored in the data cache as well. The memory safety tag may serve as additional meta data. When the block is evicted and written to memory 40, then the stored memory safety tag is used to encrypt the data, and then the encrypted data is stored in memory 40 (or a lower level cache, as will be explained in accordance with another embodiment).

At 220, when the request includes a command to store data, the first processor 10 processes the request by generating a pointer for the data to be stored. The pointer has a first portion including an address and a second portion including a memory safety tag. The address may be a physical or logical address indicating where the data is to be stored in memory 40. This physical or logical address may be determined, for example, using any one of a variety of addressing schemes, e.g., the address may be a next-available address or an address at a specific area in the memory 40, as determined by the first processor 10.

In one embodiment, a memory safety tag may be assigned to the data stored at each memory address or each block of data. The memory safety tag may be generated based on predetermined rules and/or policies designated for the memory architecture. For example, two neighboring arrays may not have the same tags. Structurally, each memory safety tag may be a predetermined number of bits indicating a tag value generated by the first processor 10. In one embodiment, the tag value may be a nonce value, e.g., a random or pseudorandom value generated by the first processor 10. In one embodiment, the tag value may be one of a plurality of counter values sequentially generated by the first processor 10. In one embodiment, the tag value may be generated based on a predetermined algorithm In one embodiment, the memory safety tags may be managed solely probabilistically.

Figure 3:
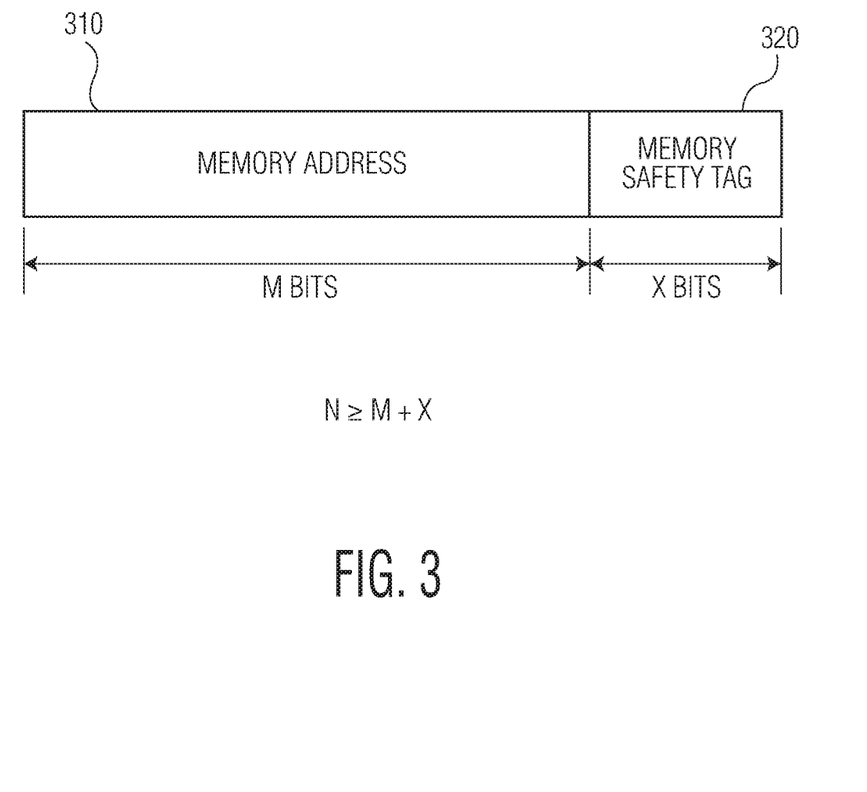
FIG. 3 illustrates the structure of a pointer according to one embodiment.

FIG. 3 illustrates an example of a pointer that may be generated by the first processor 10. The pointer includes a memory address 310 and a memory safety tag 320. In one embodiment, the memory address 310 and memory safety tag 320 may have a different number of bits. For example, the memory address 310 may be M bits in length and the memory safety tag 320 may be M bits in length, where N>M. The memory safety tag 320 may be any of the tag values previously described. For illustrative purposes, the pointer may be referred to as a tagged pointer, which in FIG. 1 is transferred from the first processor 10 to the memory manager 20. Since the request (in this case) is to store (write) data, the data to be stored may also be transferred to the memory manager 20 without encryption.

Returning to FIG. 2, in addition to generating the pointer, the first processor 10 may output a cryptographic key to the second processor 30. The cryptographic key may be a public key, a private key, or a public key and private key pair. Various symmetric algorithms may be used to generate the keys. Examples of symmetric (private key) algorithms include advanced encryption standard (AES) and the data encryption standard (DES), which are ones based on n-bits which, for example, may be expressed as a hexadecimal number and hierarchical deterministic wallet keys, as well as others.

At 230, the memory manager 20 stores the pointer (address and memory safety tag) in a location accessible by the memory manager. The pointer may be stored in this location, for example, so that it may be accessed in order to read the stored data in the memory when requested and/or for performing other operations. The storage location may be, for example, a cache located within or otherwise accessible by the memory manager 20. In one embodiment, the memory manager 20 may include a memory management unit (MMU) including or coupled to the aforementioned cache.

At 240, the memory manager 20 outputs the memory safety tag and the data to be stored to the second processor 30, which performs a cipher operation. For this reason, the second processor 30 may be referred to as a cipher engine.

At 250, the cipher engine encrypts the data using the key received from the first processor 10 and the memory safety tag. When used in this manner, the memory safety tag may be considered to be a tweak used to create a tweakable block cipher of the data to be stored in the memory 40. In one embodiment, when data is evicted from the cache of the memory manager 20 (e.g., because its storage location in the data cache is used for other data), then a check is performed to determine whether the data is dirty. If so, then the data will be encrypted with the memory safety tag that is associated with the data block in the cache. The encrypted data may then be sent to memory to the address in memory where it came from. The cipher engine (second processor 30) may perform, for example, a Feistel cipher using the key and the memory safety tag.

Encrypting the data based on the key and tweak serves as an extra measure for safeguarding the data stored in the memory. For example, if a malicious attacker were able to access the encrypted data from memory 40, the data would be unintelligible to the attacker (e.g., meaningless garbage) unless both the key and memory safety tag were used for decryption. Even if the attacker were somehow able to determine the key, the attacker would still be unable to read the data without the memory safety tag.

At 260, the cipher engine transfers the now-encrypted data for storage at the physical address indicated by the memory manager 20.

Figure 4:
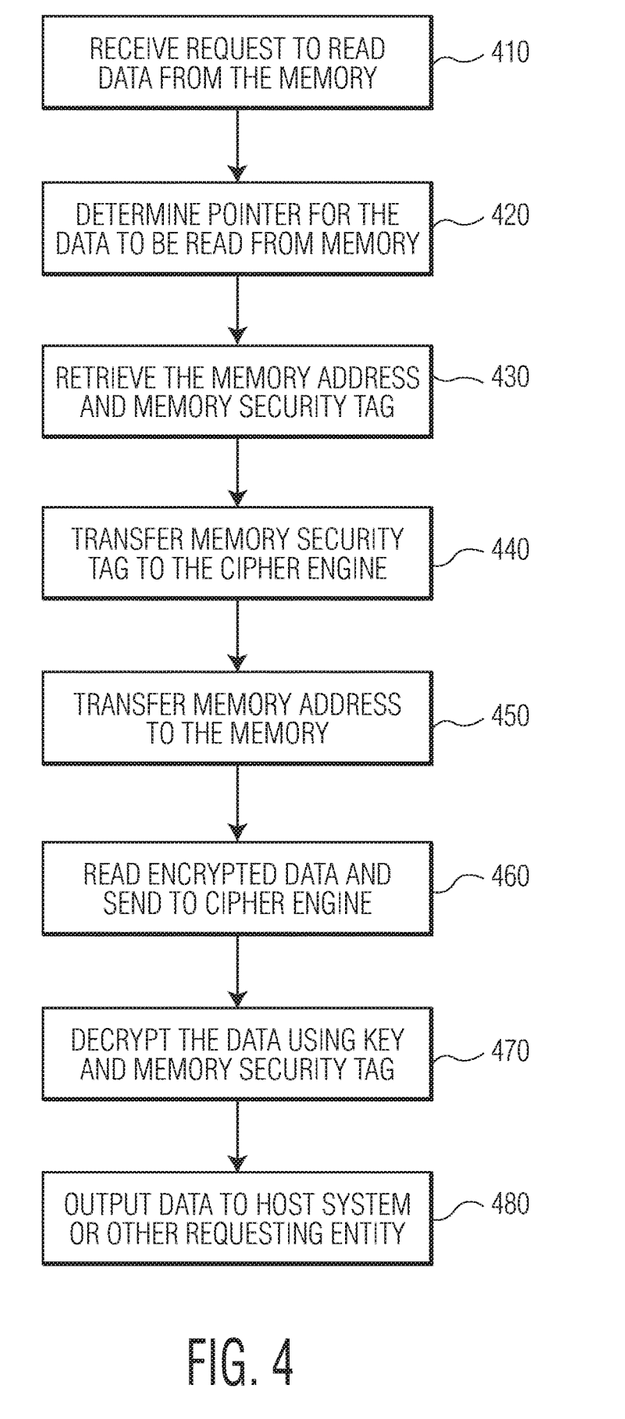
FIG. 4 illustrates another embodiment of a method for securing data in a memory.

FIG. 4 illustrates an embodiment of a method for reading data stored in memory 40 based on the pointer that was used to encrypt the data. In one embodiment, reading data from the memory using the pointer may be referred to as dereferencing the pointer.

At 410, the method includes receiving a request at the first processor 10 to retrieve data from the memory. The request may be received from the host system, for example, in connection with a predetermined application. At this point, the first, processor 10 may send an instruction to the memory manager 20 indicating that data is to be read from the memory. The first processor 10 may also output the key used to encrypt the stored data to the second processor 30.

At 420, the memory manager determines the pointer corresponding to the data to be read from the memory 40. This may be accomplished, for example, as follows. The processor may operate based on virtual addresses. Thus, a pointer may include a memory safety tag and a virtual address. The memory manager (or memory management unit (MMU)) 20 may translate the virtual address to a physical address. Then, the physical address is used to retrieve the dam from the cache. If the data is not there (e.g., a cache miss), then the data may be loaded from memory 40 (or a lower level cache, as in another embodiment). Before being stored in the cache of the memory manager 20, the data is decrypted with a key and the memory safety tag. The memory safety tag used to logger loading of the data in the cache may also be stored with the data, so that whenever it is evicted and has become dirty it can be encrypted again with this memory safety tag.

At 430, once the pointer is identified and located in the cache of memory manager 20, the memory address and memory security tag, in the pointer and which was used to encrypt the data, are retrieved from the cache. The encrypted data stored at each memory address may be encrypted (and thus decrypted) using the same key but a different memory security tag, e.g., a different memory security tag may be used to encrypt the data at each address or cache line in the memory 40.

At 440, the memory manager 20 transfers the memory security tag to the second processor 30 (cipher engine).

At 450, the memory manager 20 transfers the memory address (e.g., physical address) obtained from the pointer to the memory 40.

At 460, the memory reads the encrypted data from the memory address received by the memory manager 20. Further, at 460, the encrypted data is output to the second processor 30.

At 470, the cipher engine of the second processor 30 decrypts the encrypted data using the key received from the first processor 10 and the memory security tag received from the memory manager 20. Because the data was encrypted using the memory security tag, any attempt to decrypt the data without the memory security tag (tweak) will be unsuccessful, even if a malicious attacker were somehow able to obtain the encryption key. The same algorithm used to decrypt the data may be used as a basis for decrypting the data.

At 480, the decrypted data is transferred, for example, to the host system (or requesting entity) along a signal path that passes through the memory manager 20 and the first processor 10.

Figure 5:
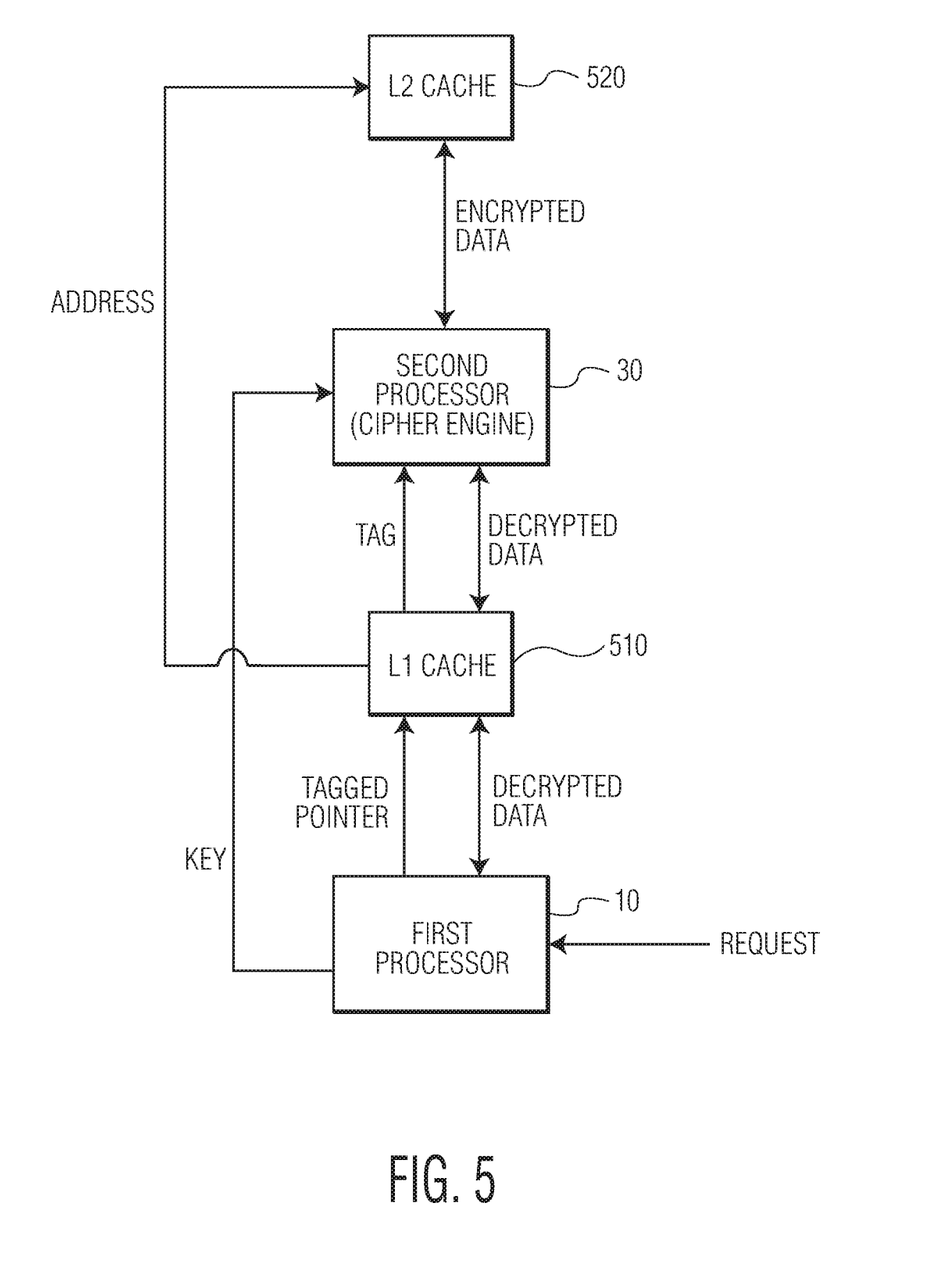
FIG. 5 illustrates another embodiment of a system for securing data in a memory.

FIG. 5 illustrates another embodiment of a system for securing data stored in a memory. In this embodiment, memory manager 20 and memory 40 in FIG. 1 are replaced by a first cache (L1) 510 and a second cache (L2) 520, respectively, and the encrypted data is cached instead of being stored in a memory.

Referring to FIG. 5, cache L2 stores the data in encrypted form and cache L1 stores the data both in encrypted and decrypted form. Cache L1 (or a different storage area) may also store memory safety tags for the data stored in the L2 cache and metadata. Thus, in the embodiment of FIG. 5, the storage size of the cache lines in L1 may be greater (e.g., two times larger) than the storage size of the cache lines in L2. As with the embodiment of FIG. 1, each pointer may include an address and a memory safety tag. The address may correspond to a cache line in L2, which stores data which is encrypted using the key and a unique memory safety tag.

The metadata may include a first control bit T and a second control bit A. The first control bit T may keep track of the tag that was used to decrypt the data stored in the L1 cache. The second control bit A may provide an indication of whether the data has been accessed by the first processor (e.g., CPU) 10. The metadata T and A may be used to resolve problems which arise, for example, when an attempt is made to access and decrypt data from the L2 cache using an incorrect or unintended memory safety tag, e.g., prefetching could request a cache line which does not belong to the pointer that was used to encrypt the data at that cache line. Also, if the granularity used for tagging the data is smaller than the cache line size in L2, it is possible that several memory safety tags have to be used in order to correctly decrypt the entire contents of the cache line.

In order to solve these problems, the embodiment of FIG. 5 implements a solution that represents an area-performance tradeoff. The solution includes configuring the L1 cache to have two slots for each cache line 610 in the second cache L2. The first slot 620 stores a copy of the encrypted data stored in a corresponding cache line in L2. The second slot 630 stores the decrypted version of the cache line data, e.g., the cache line data from L2 that has been decrypted by the cipher engine 30. The first cache L1 also stores the metadata T and A for each cache line. In the embodiment of FIG. 5, slots 620 and 630 of each cache line in the first cache L1 may be partitioned into a predetermined number of sections or blocks, e.g., eight words DQword 1 to DQword 8. Metadata (T and A) may be stored in association with each word of the cache line 610. In one embodiment, each slot of a cache line may include a single word with corresponding metadata T and A.

Figure 6:
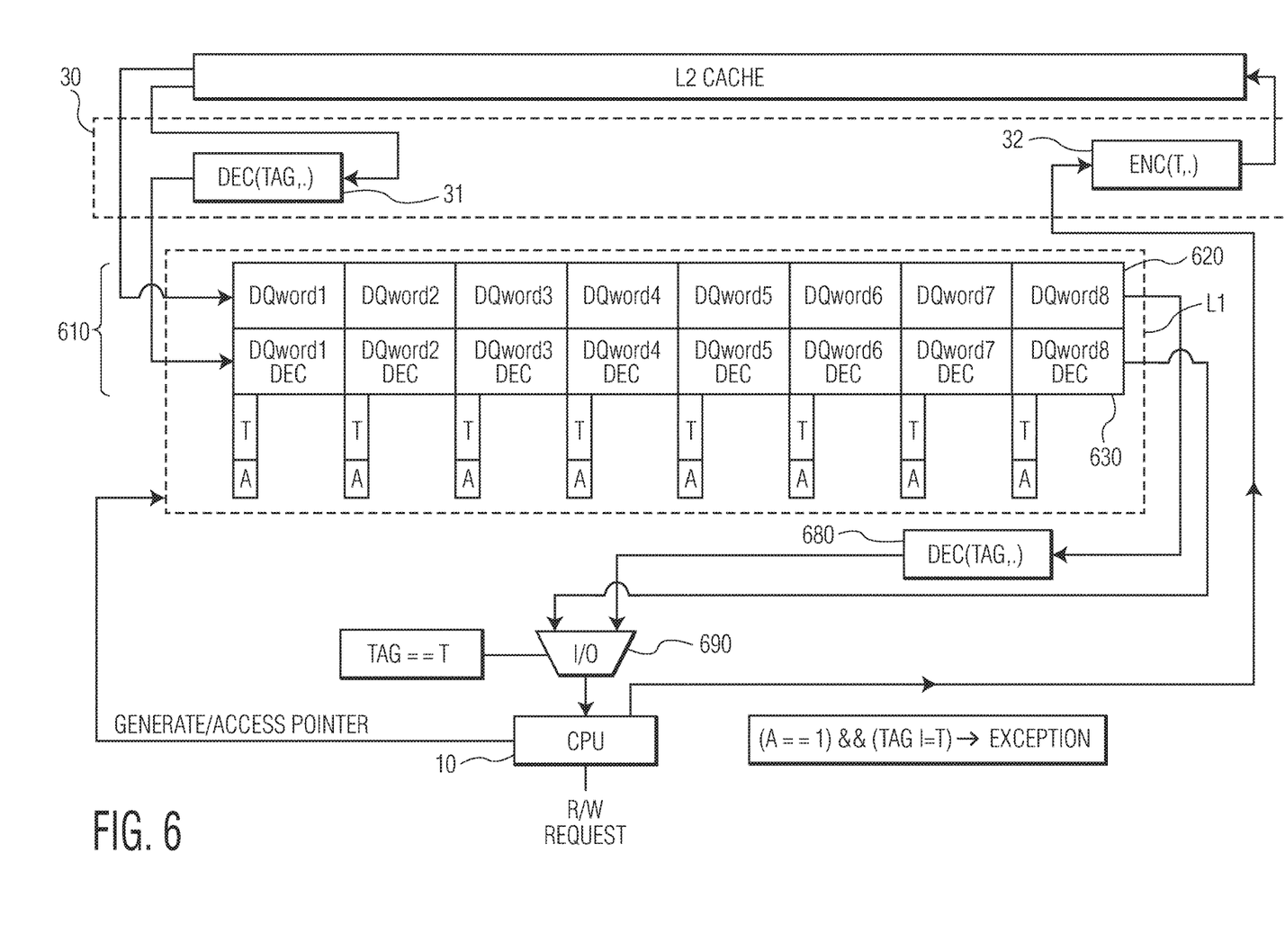
FIG. 6 illustrates another embodiment of a system for securing data in a memory.
Figure 7A:
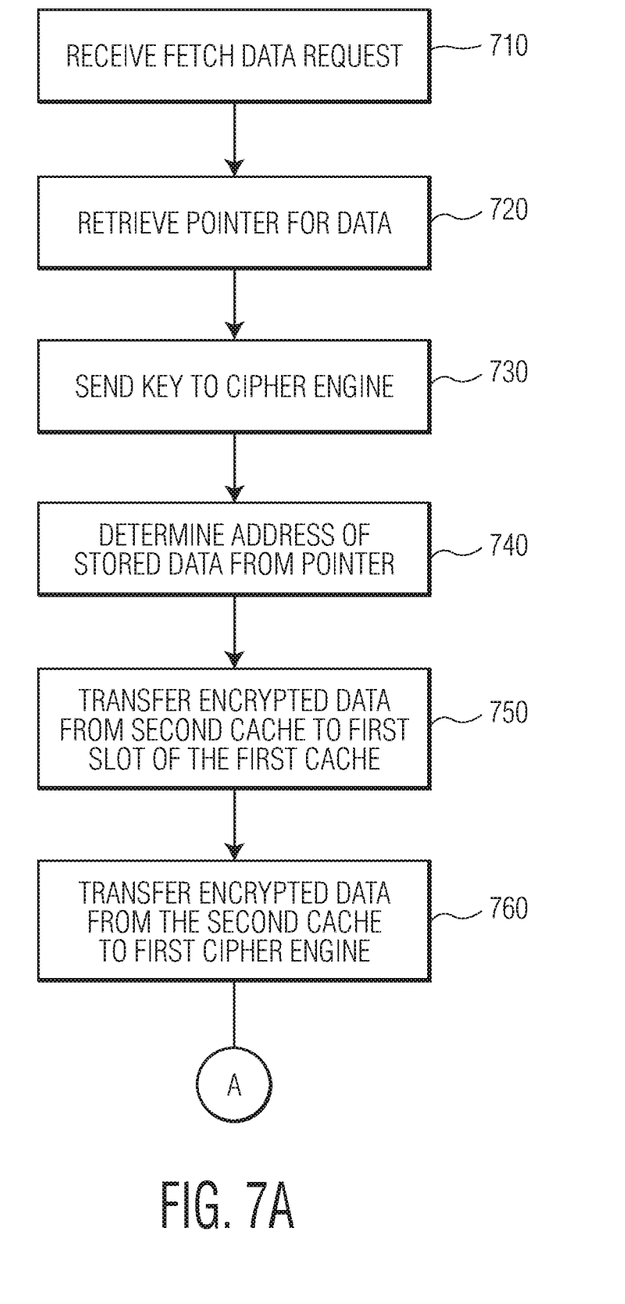
FIGS. 7A and 7B illustrate another embodiment of a method for securing data in a memory.
Figure 7B:
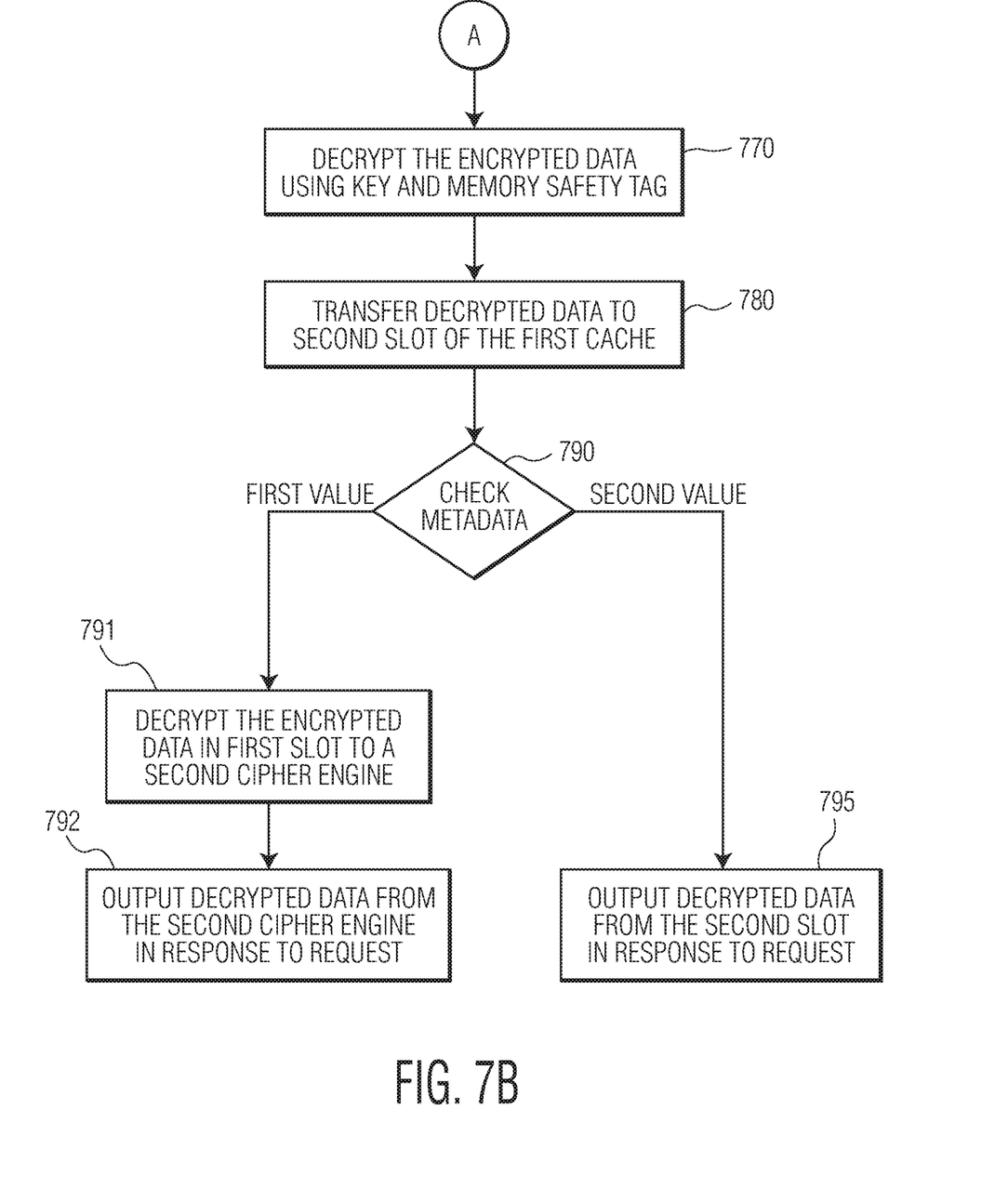

FIGS. 7A and 7B illustrate an embodiment of a method for controlling operation of the systems illustrated in FIGS. 5 and 6. The method includes, at 710, receiving a request at the first processor 10 to fetch data from the second cache L2. At 720, the first processor 10 determines the pointer used for the data to be fetched and sends the pointer to the first cache L1. At 730, the first processor 10 sends the key (used to encrypt the data) to the second processor 30, e.g., the cipher engine. At 740, the first cache L1 retrieves the address of the cache line in L2 that is storing the requested data and transfers this data to the second cache L2. The second cache outputs the cache line (either in its entirety or serially on a DQword-by-DQword basis) along two paths. At 750, the second cache L2 transfers the encrypted data along a first path 621 to the first slot 620 of a corresponding cache line 610 in the first cache L1. At 760, the second cache L2 transfers the encrypted data along a second path 622 to the second processor 30.

At 770, the second processor (cipher engine) 30 decrypts 31 the data using the key received from the first processor 10 and the memory safety tag (Dec(tag,,)) received from the first cache L1. In addition to performing decryption 31, the second processor 30 may also perform encryption 32. At 780, the decrypted data is then transferred from the second processor 30 for storage in the second slot 630 of the corresponding cache line 610 in the first cache L1. At 790, metadata stored in association with one or mote of the slots is checked. When at least one value of the metadata has a first value, then, at 791, the encrypted data from the first slot of the first cache L1 is transferred to a second cipher engine 680 based on at least one value of stored metadata. At 792, the decrypted data is output from the second cipher engine in response to the request. When at least one value of the metadata has a second value, then, at 795, the decrypted data is output from the second slot of the first cache L1 based on at least one value of stored metadata. This form of the decrypted data is then output in response to the request.

Thus, the slot used to output the data in response to the request is determined based on metadata stored in the first cache in association with at least one of the first slot or the second slot. In one embodiment, the metadata may include a T bit and an A bit. The T bit in the first cache L1 is a may indicate (e.g., keep track of) the memory safety tag used to decrypt the data. The A bit in the first cache L2 may indicate whether the data has been previously accessed by the first processor 10. The values of the T and A bits may determine the action to be performed once the decrypted and encrypted data have been transferred to the slots of cache line 610 in first cache L1. Table 1 shows an example of these actions for different combinations of values for T and A.

TABLE 1

| Tag == T | A | Action |
|---|---|---|
| 0 | 0 | Decrypt the DQword from Slot 1 (again using Dec(tag,,), Store the data which has been decrypted once again in Slot 2, Transfer this decrypted data to first processor (CPU) 10, and Adjust T and set A. |
| 0 | 1 | Raise an exception. |
| 1 | 0 | Forward data from slot 2 to CPU and set A. |
| 1 | 1 | Forward data from slot 2 to CPU. |

Combination 1: (T,A)=(0,0). When T has a logical zero value, this indicates that the decrypted data output from cipher engine 30 and now stored in the second slot 630 of cache line 610 may not be reliable. When A has a logical zero value, this indicates that this data has not been previously accessed by the first processor 10. For these values of T and A, the encrypted data (Dqwords 1 to 8) stored in the first slot 620 of the first cache L1 may be decrypted by a second cipher engine 680 based on the same memory safety tag which cipher engine 31 used to decrypt the same data. The decrypted data output from the second cipher engine 680 may be stored in the second slot 530 of the cache line 610, replacing the decrypted data that was output from the cipher engine 31 for this cache line. The second cipher engine 680 may receive the memory safety tag from the first cache.

The decrypted data output from the second cipher engine 380 may be input into a selector 690, which, for example, may include a multiplexer or a switch. The value of the T bit may control the selector. For example, when T=0, the selector 690 may transfer the decrypted data from the second cipher engine 680 to the first processor 10 to provide the data in response to the Request. When the decrypted data is transferred to the processor 10, the values of T and A are updated, e.g., T is set to logical 1 and A is set to logical 1. The values of the metadata bits T and A may be set based on a control signal from the first processor 10 or based on a cache controller (not shown) for L1. The cache controller may also control all data input, output, and storage operations of the first cache. The second cache L2 may also have a cache controller storing and retrieving data.

Combination 2: (T,A)=(0,1). When T has a logical zero value, this indicates that the decrypted data output from cipher engine 30 and now stored in the second slot 630 of cache line 610 may not be reliable. When A has a logical one value, this indicates that this data has been previously accessed by the first processor 10. For these values of T and A, the controller of the L1 cache outputs a signal indicating that an exception has occurred. The exception may be, for example, the occurrence of a read error. In this case, the selector 690 may not receive a T select value from the first cache L1.

Combination 3: (T,A)=(1,0). When T has a logical one value, this indicates that the decrypted data output from cipher engine 30 and now stored in the second slot 630 of cache line 610 is reliable. When A has a logical zero value, this indicates that this data has not been previously accessed by the first processor 10. For these values of T and A, the decrypted data stored in the second slot 630 of the cache line 610 in L1 (which was decrypted by cipher engine 31) is transferred to the first processor 10 through selector 690. The logical 1 value of the T bit may cause the selector 690 to select the input corresponding to the second slot 630 of cache line 610 at this time. Also, the A bit value is set to a logical 1 to indicate that the data has been accessed by the first processor.

Combination 4: (T,A)=(1,1). When T and A have logical one values, this indicates that the decrypted data output from cipher engine 30 and now stored in the second slot 630 of cache line 610 is reliable and that this data has been previously accessed by the first processor 10. For these values of T and A, the decrypted data stored in the second slot 630 of the cache line 610 is output to the first processor 10, through the selector 690, in response to the request. The T=1 value controls the selector 690 to output the decrypted data to the first processor at this time.

Referring again to FIG. 5, in order to store data in accordance with a write operation, the first processor 10 receives a write request which, for example, includes the data to be written. The first processor 10 generates a pointer for the data and transfers the pointer to the L1 cache. The pointer includes, for example, a memory safety tag generated for the data and, for example, a logical address for storing the data in the second cache L2. The first processor 10 transfers the pointer and the data to the L1 cache 510, which stores the pointer, determines a physical address for the logical address received by the first processor 10, and transfers the physical address to the second cache L2. The first processor 10 also transfers a key to the second processor 30.

Subsequently, the first cache L1 transfers the memory safety tag to the second processor, along with the data to be stored. The second processor (cipher engine) 30 encrypts the data using the key from the first processor 10 and the memory safety tag, which is used as a tweak. The resulting encrypted data is output to the second cache L2, which stores the encrypted data at the physical address output from the first cache L1. In one embodiment, the encrypted data may not be stored in the first cache L1 until it is retrieved from the second cache L2 in response to a read request, as previously explained.

Figure 8:
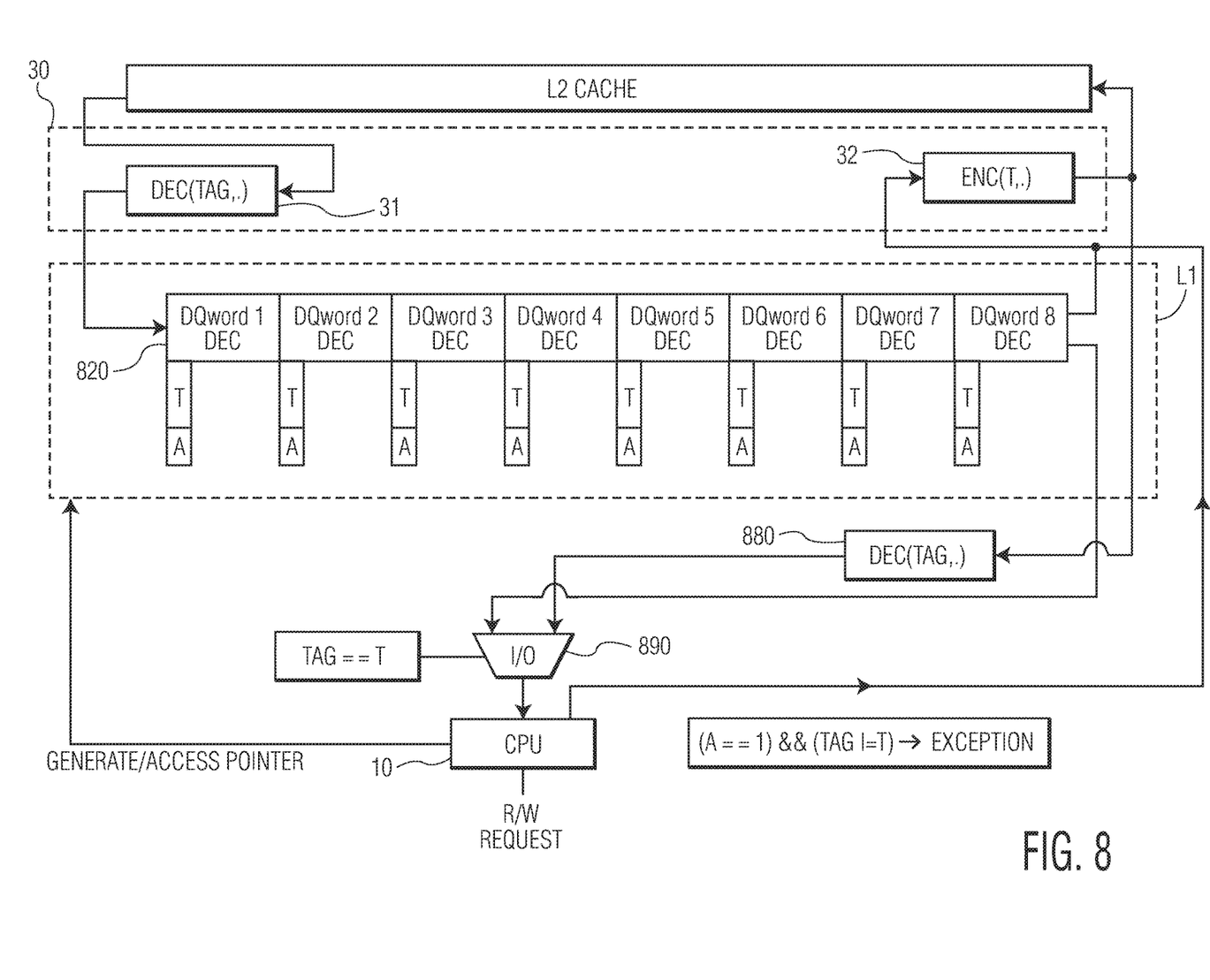
FIG. 8 illustrates another embodiment of a system for securing data in a memory.

FIG. 8 illustrates another embodiment of a system for securing the storage of data. This embodiment may be similar to the embodiment of FIGS. 5 and 6, except that each cache line 810 in the first cache L1 has only one slot 820 per cache line in the second cache L2. Thus, the size of the L1 cache in this embodiment is much less than the size of the L1 cache in the embodiment of FIG. 6. Also, the single slot 820 stores decrypted data (e.g., DQword 1 to DQword 8) output from the first cipher engine 830 with associated metadata bits T and A.

Referring to FIG. 8, the value(s) of the metadata determine the manner in which data is to be output in response to a read request, e.g., a request to read data stored in the L2 cache. When T=0, the decrypted data stored in slot 820 of the first cache L1 outputs the data to the encryption portion 830 of the cipher engine of the second processor 30. The decrypted data in slot 820 is therefore re-encrypted using the same key and memory safety tag used during the initial encryption of this data. As with other embodiments, the key and memory safety tag may be stored in the first cache L1 or in another storage area accessible by the cipher engine of the second processor.

The decrypted data may be re-encrypted, for example, when data has been fetched into the data cache that has been decrypted with the wrong memory safety tag. This may occur, for example, due to prefetching or when the block size of the cache is larger than the block size of the memory safety tagging. In one embodiment, the value of the A bit may provide an indication of whether the data has been 'accessed.' The value of A may be set to 1 when the host processor actually used data in this block.

Once re-encrypted, the data is output to a second cipher engine 880, which decrypts the re-encrypted data using the key and associated memory safety tag for this data. The zero value of T, then, controls the selector 890 to output the data (now decrypted a second time) from the second cipher engine to the first processor 10 (CPU) in response to the read request. When T=1, the decrypted data stored in slot 820 of the L1 cache is output through the selector in response to the request. No re-encryption or second-time decryption is performed under these circumstances. In this case, the value of the A bit may be 0, meaning that the data has not yet been accessed by the host processor.

As previously indicated, the first cache L1 of the embodiment of FIG. 8 may be smaller than the L1 cache in the embodiment of FIG. 6, because only one slot is dedicated per cache line in the second cache L2. Also, in one modification, only one cipher engine may be used to perform decryption, e.g., cipher engine 30 may also perform the operations of the second cipher engine 880. In order to affect this modification, an additional multiplexer circuit (or another type of switch) may be used to re-route the re-encrypted data into the cipher engine and output through the selector 890. The additional multiplexer circuit may be controlled based on one or more values of the metadata. A similar modification may also be made to the embodiment of FIG. 6, e.g., only one cipher engine may be used to perform all encryption and decryption operations, with appropriate switching performed by an additional multiplexer circuit or switch. In embodiments described herein, temporarily unused features (e.g., encryption unit) may be gated or registered at their inputs to reduce power consumption.

Another embodiment may correspond to the embodiments of FIG. 8, except that re-decryption is performed from the second cache L2. For example, in this embodiment, the CPU outputs data to the cipher engine 30, which encrypts the data using a key and a corresponding memory safety tag. The encrypted data is then stored in the second cache L2 based on an address output from the L1 cache controller (or memory manager). When a read request is received, the encrypted data is output from the second cache L2 and decrypted by the cipher engine using the key and corresponding memory safety tag. The decrypted data is stored in a corresponding cache line of the first cache L1. In this embodiment, the first cache L1 may have only one slot per cache line in the second cache L2.

One or more metadata values are then checked. For example, if A=0 and T=Tag1, then the decrypted data stored in the first cache L1 is output again to the cipher engine to be re-encrypted based on the key and memory safety tag. The re-encrypted data is passed through the second cache L2 again and output to be re-encrypted a second time through the cipher engine. The re-decrypted data is then output to the CPU through the selector, either along a direct signal path or by passing through the first cache L1 once again. In one embodiment, Dqwords are overwritten in the first cache slot when A=0. This embodiment, therefore, may use less hardware than previous embodiments described herein.

Another embodiment corresponds to the system illustrated in FIGS. 5 and 6, but with the metadata A bit not included. In this case, operation may be performed in accordance with Table 1 for the actions corresponding to A=0. For example, when T=0, the encrypted data (Dqwords 1 to 8) stored in the first slot 620 of the first cache L1 may be decrypted by a second cipher engine 680 based on the same memory safety tag which cipher engine 31 used to decrypt the same data. The decrypted data output from the second cipher engine 680 may be stored in the second slot 630 of the cache line 610, replacing the decrypted data that was output from the cipher engine 31 for this cache line. The second cipher engine 680 may receive the memory safety tag from the first cache. The decrypted data output from the second cipher engine 680 may be input into the selector 690, which transfers the decrypted data from the second cipher engine 680 to the first processor 10 based on the T=0 value.

When T=1, the decrypted data stored in the second slot 630 of the cache line 610 in L1 (which was decrypted by cipher engine 31) is transferred to the first processor 10 through selector 690. The logical 1 value of the T bit may cause the selector 690 to select the input corresponding to the second slot 630 of cache line 610 at this time.

When data decryption is only performed between the first cache L1 and the second cache L2, only the cost of the first cache L1 may be increased. The decryption latency may hide in the latency associated with accessing the second cache L2. When (tagl =T and A==0), an additional cycle may be performed for the first cache L1 access latency. However, in one embodiment, the frequency of such events may be controlled based on predetermined allocation policies. For example, if arrays and objects are always cacheline aligned, this problem may be avoided at the cost of memory inefficiency.

In one or more embodiments, write operations may be performed in a manner analogous to read operations. For example, when a dirty cache line in the first cache L1 is to be written back to the second cache L2, encryption may strictly be performed based on T values associated with every slot.

In one or more embodiments, some buffers may not be encrypted at all. For example, the data stored in direct memory access (DMA) buffers (e.g., where an outside entity accesses data directly without having any context about keys and tags) may not be encrypted. For this case, one or more of the embodiments described herein may operate based on a memory security tag having a zero value, indicating that no encryption or decryption has to be performed. Thus, for example, when the kernel copies data from user space to an I/O buffer (where the I/O buffer was mapped to a virtual address without a tag, e.g., memory security tag has a value of 0), decryption is automatically performed. Similar operations may be implemented when opening files. For example, whenever files are opened, associated buffers allocated by a kernel may always store a memory security tag having a zero value.

Another embodiment includes a non-transitory computer-readable medium that stores instructions for causing a processor to perform all or a portion of the operations of the system and method embodiments described herein. The operations of the system and method embodiments may be performed, for example, by one or more chips including processing circuits that operate to implement the methods described herein, for example, in association with the instructions stored in the non-transitory computer-readable medium.

The processors, controllers, managers, engines, and other signal-generating and signal-processing features of the embodiments disclosed herein may be implemented in logic which, for example, may include hardware, software, or both. When implemented at least partially in hardware, the processors, controllers, managers, engines, and other signal-generating and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, controllers, managers, engines, and other signal-generating and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A chip for securing storage of information, comprising:
a manager configured to access a first pointer;
a first cipher engine configured to decrypt stored data; and
a cache including a storage area and a first slot, wherein the storage area is to store metadata, and the first slot is to store the decrypted data, wherein the cache is configured to output the decrypted data from the first slot based on a first set of values of the metadata, the decrypted data output from the first slot based on a read request, wherein the first pointer includes a first area and a second area, wherein the first area includes an address indicating a storage location of the data and the second area includes a safety tag, wherein the first cipher engine is configured to decrypt the data output from the storage location based on a key and the safety tag in the second area of the first pointer, and wherein including the safety tag with the first pointer improves storage security without requiring space in the cache or another memory.

2. The chip of claim 1, wherein the first pointer has a size corresponding to an N-bit architecture, a size of the first area is M bits, and a size of the second area is X bits, where $X+M \leq N$.

3. The chip of claim 1, wherein the first cipher engine is configured to encrypt the data for storage at the storage location in response to a write request, and the data is encrypted based on the key and the safety tag.

4. The chip of claim 1, wherein the cache is configured to change the metadata stored in the storage area when the decrypted data is output from the first slot based on the read request.

5. The chip of claim 1, further comprising:

a second cipher engine, wherein the cache includes a second slot to store the data in encrypted form, wherein the cache is configured to output the data in encrypted form from the second slot to the second cipher engine based on a second set of values of the metadata, and wherein the second cipher engine is configured to decrypt the data from the second slot based on the key and the safety tag and output the decrypted data in response to a read request.

6. The chip of claim 5, wherein the cache is configured to change the metadata stored in the storage area when the second cipher engine decrypts the data.

7. The chip of claim 5, wherein at least one value of the second set of values of the metadata indicates a probability that the first cipher engine used a wrong or corrupted safety tag to decrypt the data.

8. The chip of claim 1, further comprising:

a second cipher engine, wherein the cache is configured to output the decrypted data from the first slot to the first cipher engine based on the metadata, the first cipher engine configured to encrypt the data a second time based on the key and the safety tag, and wherein the second cipher engine is configured to decrypt the data encrypted for the second time and output the data in response to a read request.

9. The chip of claim 1, further comprising:

a cache configured to store a plurality of pointers including the first pointer, wherein the cache is coupled to or included within the manager and the pointers indicate storage locations for a respectively plurality of data, and wherein the pointers include different safety tags used to encrypt respective ones of the plurality of data.

10. The chip of claim 1, wherein the first cipher engine is configured to encrypt the data for storage in the storage location.

11. A method for securing storage of information, comprising:

accessing a pointer;

decrypting stored data based on the pointer; and outputting the decrypted data in response to a read request storing the decrypted data in a first slot of a cache;

storing metadata in a storage area corresponding to the first slot; and outputting the decrypted data from the first slot based on a first set of values of the metadata, wherein the first pointer includes a first area and a second area, wherein the first area includes an address indicating a storage location of the data and the second area includes a safety tag, wherein decrypting the stored data includes decrypting the data based on a key and the safety tag included in the second area of the first pointer, and wherein including the safety tag with the first pointer improves storage security without requiring space in the cache or another memory.

12. The method of claim 11, wherein the first pointer has a size corresponding to an N-bit architecture and wherein a size of the first area is M bits and a size of the second area is X bits, where $X+M \leq N$.

13. The method of claim 11, further comprising:

encrypting the data for storage at the storage location based on a write request, the data encrypted based on the key and the safety tag.

14. The method of claim 11, further comprising:

storing the data corresponding to the first pointer in a second slot of the cache, the data stored in the second slot stored in encrypted form, and decrypting the data stored in the second slot in encrypted form based on a second set of values of the metadata, the data stored in the second slot decrypted based on the key and the safety tag corresponding to the first pointer.

15. The method of claim 14, further comprising:

changing the metadata stored in the storage area when encrypted data stored in the second slot is decrypted.

16. The method of claim 14, wherein each of the first set of values of the metadata and the second set of values of the metadata includes at least one value.

17. The method of claim 11, further comprising:

encrypting the decrypted data stored in the first slot based on the metadata, the decrypted data encrypted a second time based on the key and the safety tag.

18. The method of claim 11, further comprising:

encrypting the data for storage in the storage location.

* * * * *